Oct. 27, 1964  B. O. KAPPELMANN  3,154,032
PRECISION SEED PLANTING APPARATUS
Filed April 1, 1963  3 Sheets-Sheet 1
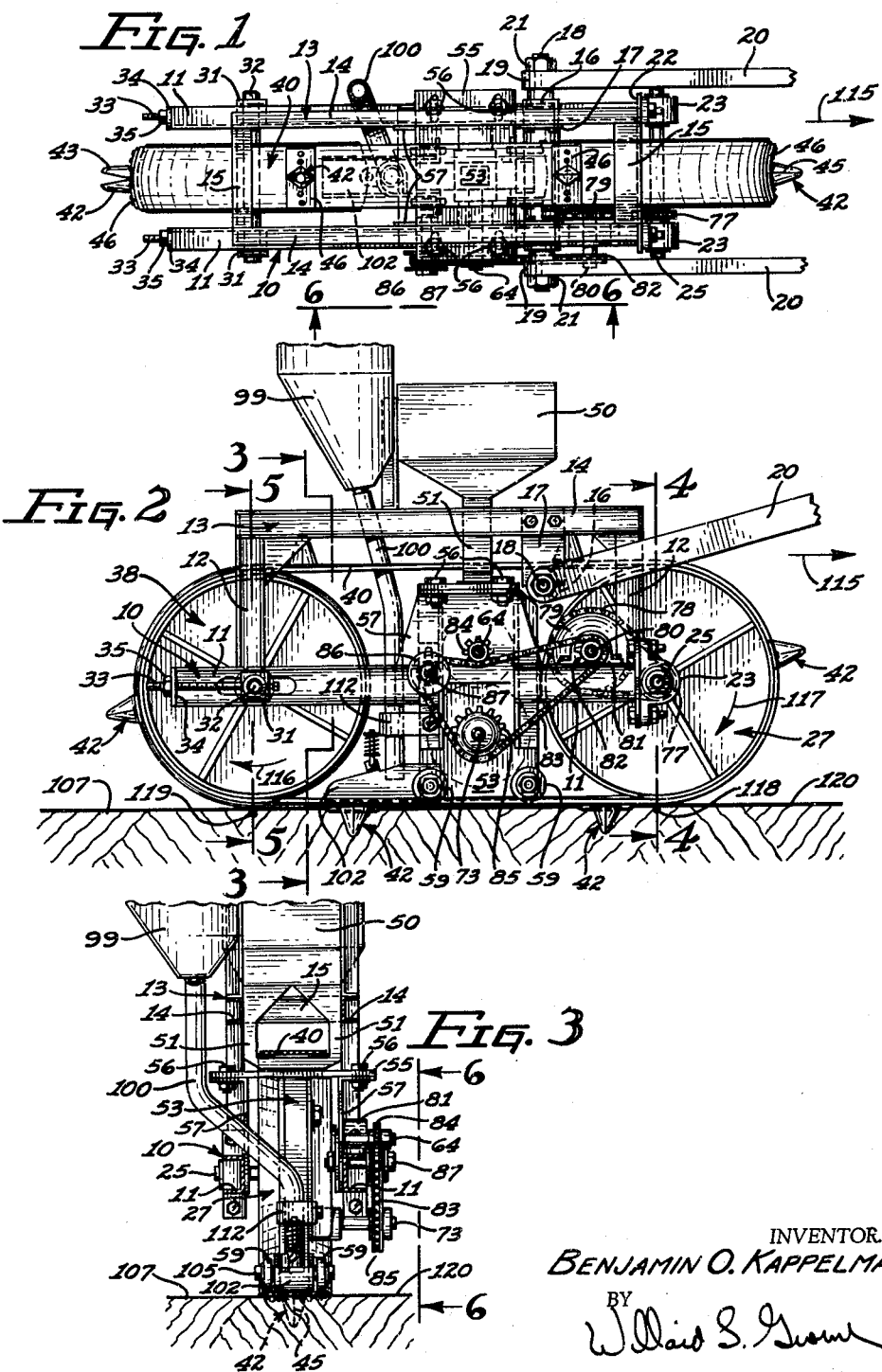
INVENTOR.
BENJAMIN O. KAPPELMANN.
BY William S. Grimm
ATTORNEY.

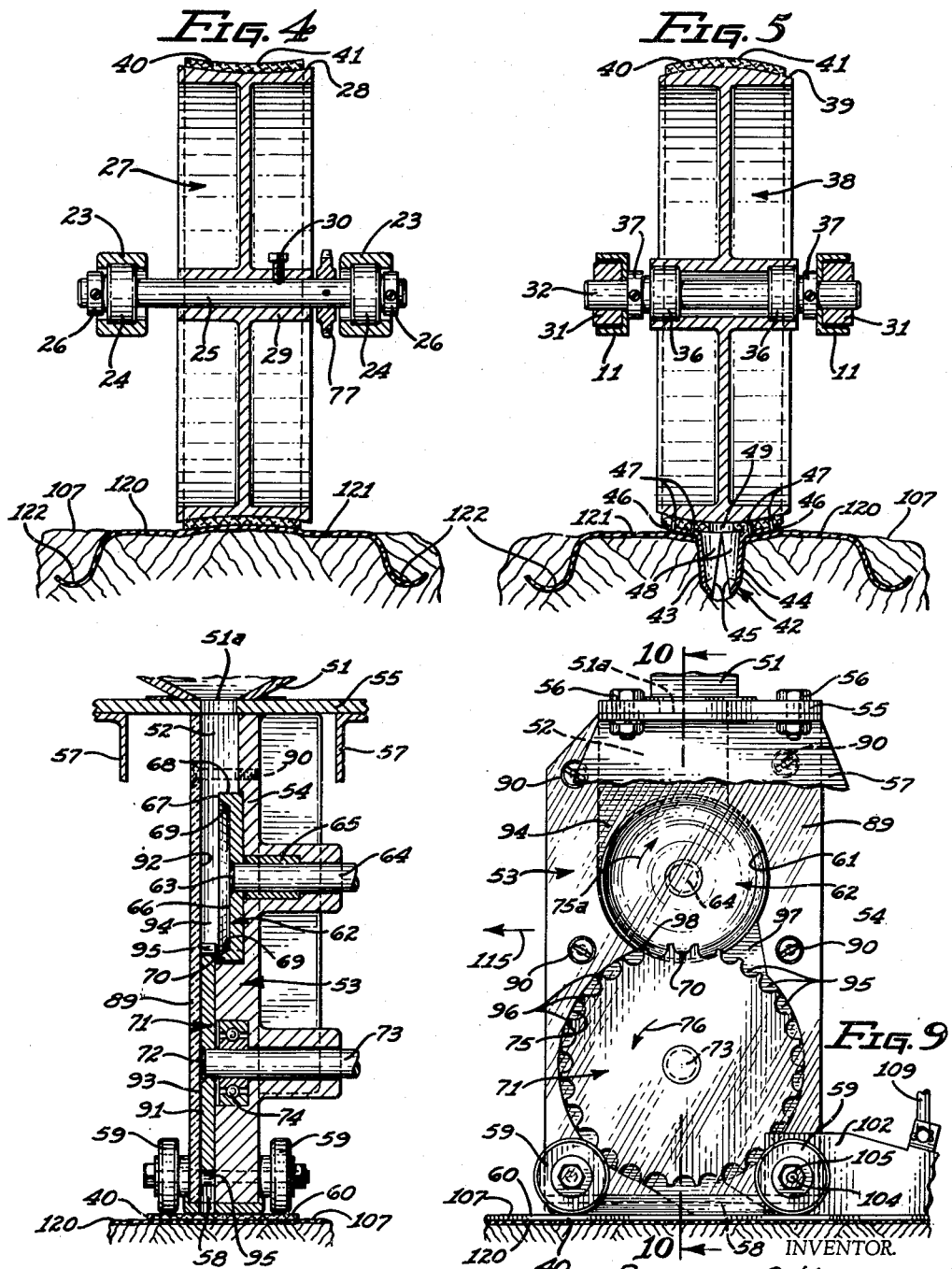

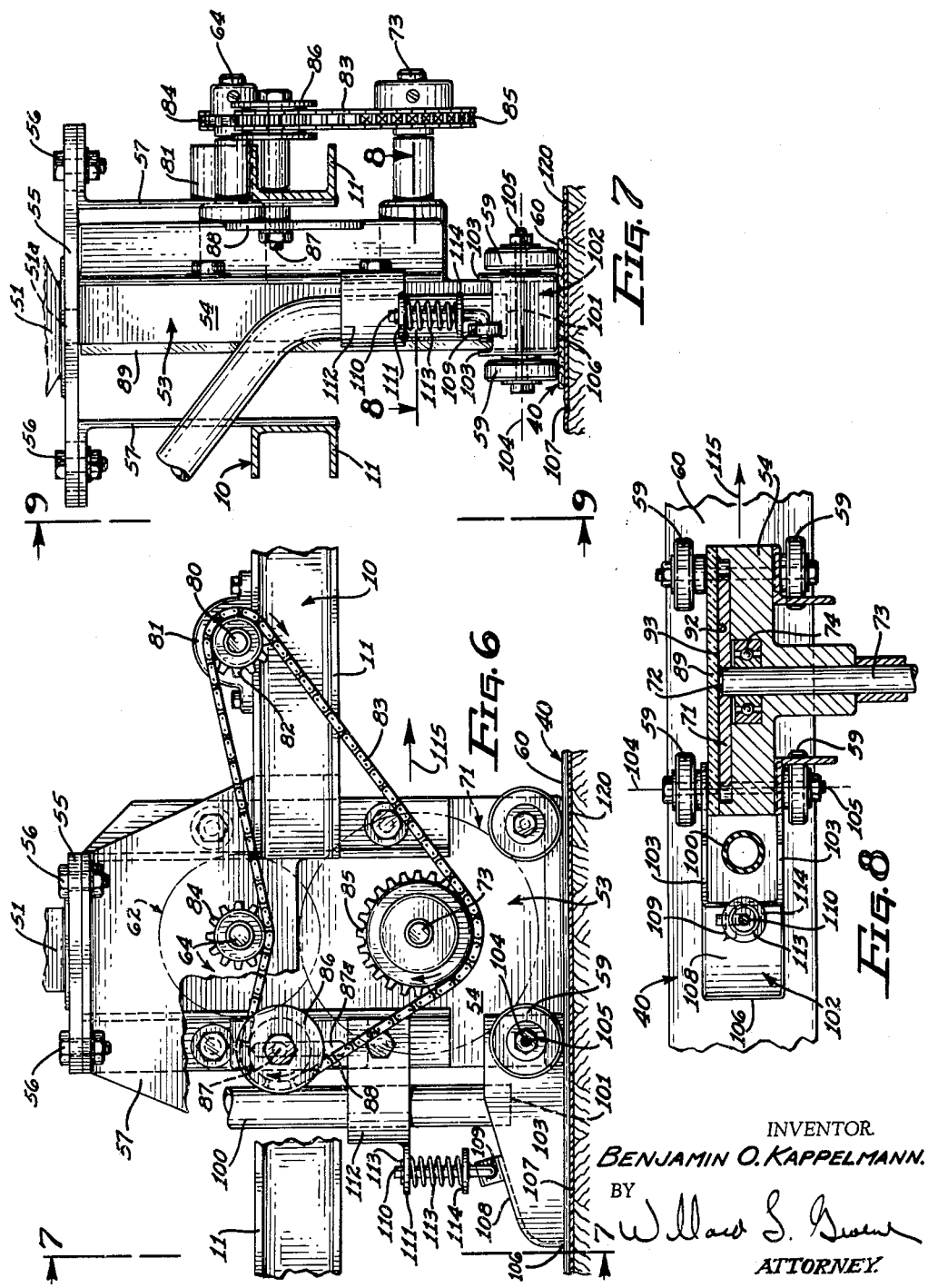

United States Patent Office 3,154,032
Patented Oct. 27, 1964

3,154,032
PRECISION SEED PLANTING APPARATUS
Benjamin O. Kappelmann, Phoenix, Ariz., assignor to Precision Agricultural Machinery Company, Phoenix, Ariz., a corporation of Arizona
Filed Apr. 1, 1963, Ser. No. 269,660
4 Claims. (Cl. 111—77)

This invention pertains to seed planting apparatus and is particularly directed to a precision seed planter for accurately planting seed in a prepared plant row of a field.

This application is related to copending application Serial Number 207,114, filed July 2, 1962.

One of the objects of this invention is to provide a precision seed planter for accurately and rapidly planting seeds at longitudinally accurately spaced intervals along a plant row of a field.

Another object of this invention is to provide a precision seed planter capable of injecting at high speed a seed below the ground level at precisely spaced intervals along the field plant row.

It is a further object to provide a precision planter that is particularly well adapted to plant seed and fertilized-mulch through a plastic sheet stretched over the soil of the plant row at accurately spaced intervals along the plant row.

Still another object of this invention is to provide a precision planter capable of perforating and planting seed and then a fertilizer and/or mulch through a plastic sheet covered plant row in such manner that the planted materials in the ground are in exact register with the perforations in the plastic sheet with no stranded materials abandoned under the unperforated portions of the plastic sheet.

It is also an object to accomplish the above recited objectives with a precision seed planter operable over the crop row in a continuous automatic manner.

A further object is to rapidly and accurately feed seed in exact amounts without cracking, grinding up or otherwise damaging the seed finally discharged for planting in the ground.

It is a further object to accomplish the above recited objectives with a specially constructed precision feeding unit devoid of reciprocating parts and operable over the crop row in a continuous rapid automatic manner.

Another object is to provide the aforementioned feeding unit operating in conjunction with an endless belt having a series of longitudinally split perforating and planting fingers projecting from the periphery thereof wherein the belt is carried on a pair of pulleys, one having a convex periphery and the other a concave periphery such that the operation of the belt over the pulleys effects the lateral opening and closing of said split fingers while the feeding unit presents seed, fertilizer and mulch through the belt and planting fingers.

Further features and advantages of this invention will appear from a detailed description of the drawings in which:

FIG. 1 is a top plan view of a precision planting apparatus incorporating the features of this invention.

FIG. 2 is a right hand side elevation of the apparatus shown in FIG. 1.

FIG. 3 is a fragmentary sectional view on the line 3—3 of FIG. 2.

FIG. 4 is an enlarged sectional view on the line 4—4 of FIG. 2.

FIG. 5 is an enlarged sectional view on the line 5—5 of FIG. 2.

FIG. 6 is an enlarged right hand side elevation indicated by the line 6—6 of FIGS. 1 and 3.

FIG. 7 is an enlarged sectional view on the line 7—7 of FIG. 6.

FIG. 8 is an enlarged sectional view on the line 8—8 of FIG. 7.

FIG. 9 is an enlarged left hand side elevation indicated by the line 9—9 in FIG. 7.

FIG. 10 is an enlarged sectional view on the line 10—10 of FIG. 9.

As an example of one embodiment of this invention there is shown a precision seed planter comprising a frame 10 consisting of a pair of side rail channel members 11 which are fixed on the lower ends of the upright brackets 12 which are rigidly fixed to the upper support frame 13 comprising the side members 14 and end members 15. The tubular support member 16 fixed to the side members 14 by suitable plates 17 is pivotally mounted on the rockshaft 18 carried in the outer ends 19 of the usual lifting and positioning levers 20 of a tractor, not shown. Suitable nuts 21 threaded on the ends of the rockshaft 18 demountably secure the described frame structure on the tractor arms 20.

On the front ends of the side rails 11, FIGS. 1 and 2, and fixed flanges 22 to which are secured the pillow blocks 23 containing anti-friction bearings 24 which support the concave pulley shaft 25, FIG. 4, held against axial movement in the bearings 24 by suitable lock collars 26 on the ends of the shaft 25. A concave pulley 27 having the concave peripheral surface 28 has the integral hub 29 which is securely locked to the shaft 25 by a suitable set screw 30.

On the rearward portions of the side rails 11, FIGS. 1 and 2, are longitudinally slidably mounted the adjusting blocks 31 in which is fixed the convex pulley shaft 32. Suitable adjusting screws 33 are fixed to and extend rearwardly from the adjusting blocks 31 and pass through abutment plates 34 fixed to rear ends of the side rails 11. Appropriate jamb nuts 35 threaded on the adjusting screws 33 abut against the plates 34 to pull the convex pulley shaft 32 rearwardly of the side rails 11 to desired positions. Anti-friction bearings 36 are held against axial movement on the shaft 32 by suitable lock collars 37 and rotatably support the convex pulley 38 having the convex peripheral surface 39. A flat belt 40 operates over the concave surface 28 and the convex surface 39 of the pulleys 27 and 38 and by appropriately adjusting the nuts 35 proper tension is maintained in the belt 40.

Projecting outwardly from the outer peripheral surface 41 of the belt 40 are the split planter fingers 42 each of which comprises a pair of laterally disposed segments 43 and 44, FIG. 5, having a parting line 45 lying in a longitudinally disposed plane parallel to the direction of belt travel. Each segment 43 and 44 has a mounting flange 46 extending laterally away from the parting line 45 outwardly from the root of the planter finger segment which is securely riveted at 47 or otherwise secured to the outer peripheral surface 41 of the belt 40. Each of the segments 43 and 44 are hollowed out at 48 so as to form a seed compartment which communicates with an opening or seed passageway 49 formed in the belt 40.

A seed hopper 50, FIG. 2, carried on the seed supply pipe 51 appropriately fixed to the frame 10 has a discharge opening 51a, FIGS. 9 and 10, at its lower end communicating with the inlet passageway 52 of the precision seed feeding unit 53 comprising the main housing 54 which is fixed to the mounting plate 55 which in turn is secured by bolts 56, FIGS. 6 and 7, to the upright supports 57 fixed to the side rails 11.

The lower discharge outlet 58 of the unit 53 is supported in alignment with the seed passageways 49 in the belt so that these passageways 49 successively pass under the discharge outlet 58 as the belt 40 operates over the pulleys 27 and 38. The lower end of the unit 53 is provided with rollers 59 journaled thereon adapted to ride on the inside face 60 of the belt 40 to maintain proper running clearance between the belt and the discharge outlet 58 of the unit 53.

Referring particularly to the precision seed feeding unit 53, FIGS. 6, 7, 8, 9 and 10, at the lower end of the inlet passageway 52 within a circular recess 61 is rotatably mounted the cupped feed disc 62 which is fixed on the inner end 63 of the feed disc shaft 64 journaled in a suitable bearing 65 carried in the housing 54. The cupped feed disc 62 is recessed at the surface 66 below the outer lip 67 and adjacent the outer periphery 68 is a bevelled conical surface 69 extending inwardly to the recessed surface 66. In front of and overlapping the lip and bevelled conical surface 69 of the feed disc 62 at 70 is the metering and distributing sprocket 71 fixed to the inner end 72 of the sprocket shaft 73 journaled on a suitable bearing 74 in the housing 54, the sprocket 71 being contained within a recess 75 formed within the housing 54.

The cupped feed disc 62 is rotated at a relatively rapid rate in the direction indicated by the arrow 75d while the metering and distributing sprocket 71 rotates relatively more slowly in the direction indicated by the arrow 76. The rotation of the disc 62 and sprocket 71 is effected in timed relationship with the relative movement of the belt 40 under the unit 53 by the drive transmission best shown in FIGS. 1, 2, 6 and 7. A drive sprocket 77 is fixed on the concave pulley shaft 25 over which operates a chain 78 which in turn operates over the sprocket wheel 79 fixed to an intermediate shaft 80 suitably journaled in appropriate bearings in the bearing block 81 fixed to the side rail 11. The outer end of the intermediate shaft 80 has fixed to it a sprocket 82, FIG. 6, over which operates the chain 83. A relatively small sprocket 84 is fixed to the outer end of the feed disc shaft 64 while a larger sprocket 85 is fixed to the outer end of the sprocket shaft 73. An adjustable idler pulley 86 is journaled on the shaft 87 of the idler bracket which is adjustable vertically in the slotted opening 87d in the plate 88 suitably fixed to the frame 10 to maintain proper tension in the chain 83 which is in operative engagement with the sprockets 82, 85, idler 86 and sprocket 84 as best shown in FIG. 6.

Referring particularly to FIGS. 8, 9 and 10, the left hand side of the housing 54 of the unit 53 is covered by a transparent plate of suitable plastic material 89 held in place by suitable screws 90 and has a close clearance at 91 between the inside face 92 of the transparent plate 89 and the outer face 93 of the sprocket 71 for proper running clearance. The inside face 92 of the plate 89 is spaced from the lip 67 of the cupped feed disc substantially the width of the sprocket 71 so as to form a seed chamber 94 communicating with the inlet passageway 52 so that the seed fed from the hopper 50 fills the chamber 94 and lies against the cupped face of the feed disc 62. Seed is fed by the rotation of the disc 62 when rotating up the bevelled surface 69 toward the lip 67 into the spaces 95 between the teeth 96 of the sprocket 71 to fill these spaces by radial inward and axial presentation of the seeds in the passageway 97 and overlap area 70 into the tooth spaces 95. As the teeth 96 leave the overlap area 70 at the point 98 excessive seed in the tooth spaces 95 are removed radially outwardly of the sprocket 71 by the upward movement at the point 98 caused by the rotation of the disc 62 so that no seed is crushed or ground up as the sprocket continues to rotate, properly loaded with seed, into the recess 75. As the sprocket teeth 96 reach the upper end of the lower discharge outlet, seed is dropped therethrough onto the inside face of the belt 40 for passage into the seed passageways of the belt as described. The rate of rotation of the sprocket 71 timed with movement of the belt provides the desired amount of seed to be presented through each passageway 49 into each planting finger 42 while the more rapidly oppositely rotating cupped feed disc 62 continuously maintains the proper charging of the correct amount of seed in the sprocket 71 without damage to the seed.

In addition to the seed dispensing apparatus just described, there is also provided means discharging fertilized mulching material and the like on top of and around the planted seed comprising the supply hopper 99, FIG. 2, suitably fixed to the frame 10 and having a discharge pipe 100 having a lower discharge opening 101 opening immediately above the belt 40, FIG. 6. Surrounding the lower discharge opening 101 is the distributing shoe 102 comprising the side plates 103 pivotally mounted about the axis 104 of the shaft 105 for the rear rollers 59 carried on the housing 54 so that its outer scraper edge 106 rides on the inside face 60 of the belt 40 despite any irregularities of the ground surface 107 over which the belt is traveling. The rear end of the side plates 103 are shrouded by the cover 108 to which is fixed a lug 109. An upstanding rod 110 is pivotally connected to the lug and extends upwardly through a suitable clearance hole in a lug 111 fixed to a bracket 112 supporting the lower end of the discharge pipe 100 and fixed to the frame 10. A cotter pin 113 passing through the upper end of the rod 110 and engaging the top of the lug 111 limits downwardly swinging movement of the distributing shoe 102. A compression spring 113 engaging the underside of the lug 111 and the top side of a washer 114 serves to yieldingly swing the distributing shoe downwardly against the belt 40.

In operation: The above described precision seed planter is placed on the ground surface 107 of the plant row berm to be seeded, as best shown in FIG. 2. The unit is then moved along in the direction indicated by the arrow 115 by a suitable tractor so that the pulleys 27 and 38 rotate in the direction indicated by the arrows 116 and 117 with the lower portion of the belt 40 in stationary contact with the ground surface 107. As the belt 40 travels over the concave peripheral surface 28 of the pulley 27 the parting line 45 is held tightly closed as a planting finger 42 is rolled into the ground surface 107 at the point 118. As the unit travels the lower discharge outlet 58 of the precision seeding unit, FIG. 9, arrives over the seed passageway 49 in the belt and the seed drops in the hollowed out portion 48 of the seed finger 42. Next, fertilizer and mulch materials such as vermiculite and the like, are then fed from the distributing shoe and passageway 49 into the finger 42.

As the convex pulley 38 arrives over the injected seed finger 42 at the point 119 the finger opens laterally as shown in FIG. 5 allowing the seed, fertilizer and mulch materials to drop from the finger into the cavity formed in the ground by the finger. As the belt 40 moves upwardly over the pulley 38 the opened finger 42 is withdrawn from the ground cavity in such a way as to leave the cavity so as to cause soil from the side walls of the cavity to cave in and cover the material in the bottom of the cavity for proper growth. The belt and fingers then return along the upper run of the belt 40 to the pulley 27 to repeat the described cycle of operation. Because of the positive spacing of the fingers 42 along the belt and precise seed and material control to the fingers, a high precision of plant spacing results in the field seeded with this device.

This apparatus is particularly well adapted for planting seed through a plastic sheet 120 applied to a plant row by a method and apparatus such as shown in copending application Serial No. 216,637, filed August 13, 1962. In this arrangement a plastic sheet 120 is stretched over the plant row surface 121 and held by the depressed ends 122 secured by the soil. The unit travels over the top of the plastic sheet 120 planting the seed in the ground as described, the fingers 42 perforating the sheet and then withdrawing leaving the planted seed and other materials in exact register with the perforations formed in the sheet with no materials left abandoned under the sheet between the perforations. Thus, a highly efficient planting operation through the plastic sheet is accomplished automatically with speed, precision and great accuracy.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters patent is:

1. A precision seed planter comprising in combination:
   (a) a frame,
   (b) a concave pulley journaled on the front end of said frame,
   (c) a convex pulley journaled on the rear end of said frame,
   (d) a flat belt operating over the peripheries of said pulleys,
   (e) a series of longitudinally spaced planter fingers mounted on the outer peripheral surface of said belt, each finger comprising,
   (f) a pair of laterally positioned segments having,
   (g) a parting line lying in a longitudinally disposed plane parallel to the direction of belt travel and,
   (h) mounting flanges extending laterally away from said parting line plane outwardly away from the root of said planter finger segments,
   (i) means for securing said flanges to said belt,
   (j) hollowed out portions formed in each of said segments adjacent said parting line,
   (k) a seed pasageway formed through said belt in communication with said hollowed out portions of said seed finger segments,
   (l) a precision seed feeding unit on said frame adapted to present accurately metered quantities of seed through said seed passageways in said belt as said belt travels from said concave pulley to said convex pulley comprising,
   (m) a main housing,
   (n) an inlet passageway in the top of said housing,
   (o) a lower discharge outlet in the bottom of said housing,
   (p) a seed chamber formed within said housing communicating with said inlet passageway,
   (q) a seed hopper on said frame communicating with said inlet passageway,
   (r) a cupped feed disc journaled within said main housing with its cupped face exposed within said seed chamber,
   (s) a metering and distributing sprocket journaled within said main housing having teeth formed on the periphery thereof having seed receiving spaces between said teeth moving in overlapping position relative to the lip of said cupped feed disc face,
   (t) said sprocket being adapted to receive seed radially and axially from said cupped face of said feed disc and to discharge excess seed from between said sprocket teeth to said feed disc,
   (u) said sprocket being further adapted to discharge seed from between its teeth at a circumferentially remote point in said main housing into said lower discharge outlet for discharge through said seed passageway in said belt,
   (v) and drive transmission means on said frame for rotating said cupped feed disc and said metering and distributing sprocket from the movement of said pulleys and belt over the ground surface.

2. A precision seed feeding unit for a planter comprising in combination:
   (a) a main housing adapted to be mounted on a planter,
   (b) a lower discharge outlet formed in said main housing,
   (c) an inlet passageway formed in said main housing,
   (d) a seed source connected to supply seed to said inlet passageway,
   (e) a circular recess formed in said main housing below and in communication with said inlet passageway,
   (f) a cupped feed disc journaled in said main housing and located within said recess,
   (g) a recessed surface in the face of said feed disc surrounded by a bevelled outer surface extending outwardly to a lip on the periphery of said disc,
   (h) a metering and distributing sprocket journaled within a recess in said housing having teeth formed on the periphery thereof overlapping the front face lip of said feed disc,
   (i) the spaces between said teeth being charged with seed from the cupped recess of the face of said disc,
   (j) said sprocket discharging seed from said spaces between said teeth at a circumferentially remote location from said overlap between said disc and sprocket into said lower discharge outlet.

3. A precision seed feeding unit for a planter comprising in combination:
   (a) a main housing adapted to be mounted on a planter,
   (b) a lower discharge outlet formed in said main housing,
   (c) an inlet passageway formed in said main housing,
   (d) a seed source connected to supply seed to said inlet passageway,
   (e) a circular recess formed in said main housing below and in communication with said inlet passageway,
   (f) a cupped feed disc journaled in said main housing and located within said recess,
   (g) a recessed surface in the face of said feed disc surrounded by a bevelled outer surface extending outwardly to a lip on the periphery of said disc,
   (h) a metering and distributing sprocket journaled within a recess in said housing having teeth formed on the periphery thereof overlapping the front face lip of said feed disc,
   (i) the spaces between said teeth being charged with seed from the cupped recess of the face of said disc,
   (j) said sprocket discharging seed from said spaces between said teeth at a circumferentially remote location from said overlap between said disc and sprocket into said lower discharge outlet,
   (k) and means for rotating said cupped feed disc and said metering and distributing sprocket by the movement of the planter over the ground surface to be planted.

4. A precision seed feeding unit for a planter comprising in combination:
   (a) a main housing adapted to be mounted on a planter,
   (b) a lower discharge outlet formed in said main housing,
   (c) an inlet passageway formed in said main housing,
   (d) a seed source connected to supply seed to said inlet passageway,
   (e) a circular recess formed in said main housing below and in communication with said inlet passageway, (f) a cupped feed disc journaled in said main housing and located within said recess, (g) a recessed surface in the face of said feed disc surrounded by a bevelled outer surface extending outwardly to a lip on the periphery of said disc, (h) a metering and distributing sprocket journaled within a recess in said housing having teeth formed on the periphery thereof overlapping the front face lip of said feed disc, (i) the spaces between said teeth being charged with seed from the cupped recess of the face of said disc, (j) said sprocket discharging seed from said spaces between said teeth at a circumferentially remote location from said overlap between said disc and sprocket into said lower discharge outlet, (k) and means for rotating said cupped feed disc in the opposite direction and at a more rapid rate than said metering and distributing sprocket during the travel of said planter over the ground surface.

References Cited in the file of this patent

UNITED STATES PATENTS

| | | |
|---|---|---|
| 884,139 | Dyer | Apr. 7, 1908 |
| 2,503,828 | Loucks | Apr. 11, 1950 |
| 3,037,470 | Watson et al. | June 5, 1962 |
| 3,103,186 | Saifuker | Sept. 10, 1963 |

FOREIGN PATENTS

| | | |
|---|---|---|
| 175,874 | Sweden | June 27, 1961 |